United States Patent Office 3,252,976
Patented May 24, 1966

3,252,976
PROCESS FOR MAKING 2-SECONDARY AND TERTIARY AMINO-1-PHENYL-ETHANE THIOLS
William F. Bruce, Havertown, Roy S. Hanslick, Villanova, and Joseph Seifter, Berwyn, Pa., assignors to American Home Products Corporation, New York, N.Y., a corporation of Delaware
No Drawing. Filed Jan. 21, 1963, Ser. No. 253,520
8 Claims. (Cl. 260—247.1)

This invention relates to α-phenylalkane thiols and to the methods by which they may be prepared. More particularly this invention relates to α-phenylalkane thiols having the general formula

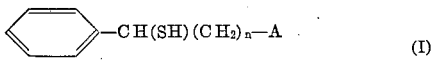

wherein $n$ has a value of from 1 to 3 inclusive and A is a monovalent radical selected from the group consisting of cycloaliphatic amino, five and six membered heterocyclic imino rings and their therapeutically administrable salts.

A preferred group of compounds within the class represented by Formula I constitutes those compounds represented by the following structural Formula II

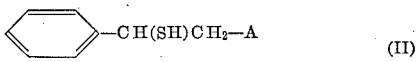

wherein A is a monovalent radical selected from the group consisting of cyclohexylamino, morpholino, piperazino, piperidino and pyrrolidino and the acid salts thereof.

It has been found that the new compounds of the present invention, particularly those encompassed within the class represented by Formula II, have properties and characteristics which make them useful as central nervous system stimulants. Additionally compounds of the present invention are useful as sedatives. When used for such purposes, the new compounds of their present invention together with their therapeutically administrable salts may be administered orally or parenterally in dosage amounts preferably from 20 to 1000 mg./day. The compounds are administered in forms such as tablets, capsules, powders, injectables, etc. In these forms, these compounds may be combined with suitable solid or liquid carriers or vehicles as desired according to conventional practice. When so used, the compounds will be present in the carrier as the active principle in an amount of from 0.001 to 1.0 gm.

The new compounds of the present invention are prepared by first reacting a selected cycloaliphatic amine compound such as cyclohexylamine or a five or six membered heterocyclic ring compound such as for example morpholine with styrene oxide in substantially equimolar amounts by heating the same under reflux for a period of from 2 to 8 hours. An intermediate 1-phenylethanol containing the ring of the starting compound will be obtained, which on treatment with thionyl chloride in a solvent, or an equivalent agent, is converted to a 1-phenylethyl chloride hydrochloride. The latter compound is reacted with an alcohol solution of thiourea by refluxing the mixture for a period of from 2 to 8 hours. On cooling, addition of ethyl acetate will bring about precipitation of the substituted 1-phenylethyl isothiouronium chloride hydrochloride which on treatment with base such as an aqueous solution of sodium or potassium hydroxide will yield the base from which the hydrochloride salt of the desired compounds are obtained.

The final product, the compounds of the present invention of Formulas I and II, are then recoverable purified in free form by conversion of the hydrochloride salt in a conventional manner.

In the foregoing description, it has been suggested that the starting compound may be selected from the group wherein A is derived from cyclohexylamine, as well as other suitable five and six membered heterocyclic compounds. Encompassed within the class of the foregoing and suitable for purposes of the present invention are morpholine, piperazine, piperidine and pyrrolidine.

With respect to converting the phenyl alkanol, the product of the first reaction step, to the halide, such as the phenylethylchloride referred to, the use of thionyl chloride has been described. Other equivalent agents such as phosphorus trichloride and phosphorus tribromide can be used. When using agents of this type including thionyl chloride, a solvent such as chloroform is preferably used.

Reference to the specific examples which follow will provide a better understanding of the compounds of this invention and a method by which the same can be prepared.

*Example I*

Morpholine (43.5 gms.) (0.5 mole) is added to a 250 ml. round bottom three necked flask equipped with a stirrer, reflux condenser and dropping funnel. To the refluxing morpholine is added dropwise, styrene oxide (60 gms.) (0.5 mole) and the solution refluxed for six hours. Upon cooling the solid which is 2-morpholino-1-phenylethanol crystallizes from ethanol and melts at 85° C.; yield 76.5%.

Analysis—
  Carbon: Calcd. 69.54%; fd. 69.50%
  Hydrogen: Calcd. 8.27%; fd. 7.99%
  Nitrogen: Calcd. 6.75%; fd. 6.94%

41.4 gms. of the above product (0.2 mole) is converted to the chloride hydrochloride with thionyl chloride in chloroform. The product 2-morpholino-1-phenylethyl chloride hydrochloride melts at 185–186° C.; yield 73%.

Analysis—
  Chlorine: Calcd. 27.1%; fd. 26.9%
  Nitrogen: Calcd. 5.3%; fd. 5.31%

Thiourea (7.6 gms.) (0.1 mole) and absolute ethanol (100 ml.) are added to a 500 ml. round bottom three-necked flask equipped with a stirrer, reflux condenser and a dropping funnel. To the refluxing solution is added dropwise an absolute ethanol solution containing 2-morpholino-1-phenylethyl chloride hydrochloride (26.2 gms.) (0.1 mole). The clear solution is refluxed for six hours. Upon cooling ethyl acetate and petroleum ether are added to precipitate the product 2-morpholino-1-phenylethyl isothiouronium chloride hydrochloride, melting at 172° C.; yield 86%.

Analysis—
  Chlorine: Calcd. 21.0%; fd. 20.8%
  Sulfur: Calcd. 9.4%; fd. 9.1%
  Nitrogen: Calcd. 12.4%; fd. 12.33%

The immediately foregoing chloride hydrochloride (25 gms.) (0.074 mole) dissolved in water (200 ml.) is added to 100 ml. of water containing sodium hydroxide (7 gms.) (0.175 mole). The solution is ether extracted three times and dried over anhydrous sodium sulfate. The clear solution is then treated with ether-HCl to give a product dl-2-morpholino-1-phenylethanethiol hydrochloride melting at 192° C.; yield 70%.

Analysis—
  Nitrogen: Calcd. 5.4%; fd. 5.43%
  Chlorine: Calcd. 13.6%; fd. 13.4%
  Sulfur: Calcd. 12.3%; fd. 11.88%

The foregoing hydrochloride can then be converted to the 2-morpholino-1-phenylethanethiol by treating with base.

*Example II*

Add dropwise styrene oxide (60 gms.) (0.5 mole) to boiling cyclohexylamine (50 gms.) (0.5 mole) with stirring. The solution is refluxed for six hours. Upon cooling the solid 2-cyclohexylamino-1-phenylethanol is filtered and crystallized from ethanol and melts at 93° C.; yield 50%.

Analysis—

Carbon: Calcd. 76.7%; fd. 76.3%
Hydrogen. Calcd. 9.58%; fd. 9.5%
Nitrogen: Calcd. 6.39%; fd. 6.2%

The 2-cyclohexylamino-1-phenylethanol (40 gms.) (0.164 mole) is converted to the chloride hydrochloride in the usual manner with thionyl chloride in chloroform. The product 2-cyclohexylamino-1-phenylethylchloride hydrochloride melts at 157° C. Yield 80%.

Analysis—

Chlorine: Calcd. 25.9%; fd. 25.6%
Nitrogen: Calcd. 5.1%; fd. 5.12%

Thiourea (7.6 gms.) (0.1 mole) in absolute ethyl alcohol (100 ml.) is added dropwise to a refluxing, stirred solution of absolute ethyl alcohol containing 2-cyclohexylamino-1-phenylethylchloride hydrochloride (27.4 gms.) (0.1 mole). The solution is refluxed for six hours. Upon cooling ethyl acetate and petroleum ether are added to precipitate 2-(cyclohexylamino)-1-phenylethyl isothiouronium chloride hydrochloride which melts at 189° C. Yield 60%.

Analysis—

Sulfur: Calcd. 9.2%; fd. 9.0%
Nitrogen: Calcd. 12.0%; fd. 11.9%
Chlorine: Calcd. 20.3%; fd. 19.7%

The above chloride hydrochloride (20 gms.) (0.057 mole) dissolved in water (50 ml.) is added to water (30 ml.) containing potassium hydroxide (7.5 gms.) (0.13 mole). The solution is ether extracted three times and dried over anhydrous magnesium sulfate. Ether-hydrogen chloride is added to the clear solution. The precipitate is dissolved in acetone and reprecipitated with ether to melt at 221° C. Yield 20%. The product dl-2-cyclohexylamino-1-phenylethanethiol hydrochloride, analyzes as follows:

Chlorine: Calcd. 13.1%; fd. 13.0%
Nitrogen: Calcd. 5.15%; fd. 5.20%
Sulfur: Calcd. 11.78%; fd. 11.95%
Carbon: Calcd. 61.9%; fd. 62.1%
Hydrogen: Calcd. 8.1%; fd. 8.33%

The monohydrate separated from moist acetone-ether and melts at 206° C.

Analysis—

Carbon: Calcd. 58.0%; fd. 57.7%
Hydrogen: Calcd. 8.1%; fd. 7.9%

*Example III*

Add dropwise, styrene oxide (60 gms.) (0.5 mole) to boiling N-methylpiperazine (50 gms.) (0.5 mole) with stirring. The solution is refluxed for six hours. Upon cooling, 2-(4-methylpiperazino)-1-phenylethanol is crystallized from ethanol and melts at 103.5° C. Yield 66%.

Analysis—

Carbon: Calcd. 70.87%; fd. 70.82%
Hydrogen: Calcd. 9.16%; fd. 9.09%
Nitrogen: Calcd. 12.72%; fd. 12.94%

2-(4-methylpiperazino)-1-phenylethanol (44.0 gms.) (0.2 mole) is dissolved in ethyl acetate (300 ml.). Thionyl chloride (50 gms.) (0.42 mole) is added dropwise. Upon cooling the solid is washed with ethyl acetate; ethanol and then ether. Crystallized from n-butanol, 1-phenyl-2-(4-methylpiperazino)ethyl chloride dihydrochloride melts at 191–192° C. Yield 61%.

Analysis—

Nitrogen: Calcd. 8.9%; fd. 8.7%
Chlorine: Calcd. 34.1%; fd. 33.4%

The dihydrochloride above (27.5 gms.) (0.1 mole) is dissolved in absolute ethanol (500 ml.). To the boiling solution is added dropwise absolute ethanol (100 ml.) containing thiourea (7.6 gms.) (0.1 mole). The solution is refluxed and stirred for six hours. Upon removal of ethanol the residue is dissolved in acetone and the product 2-(4-methylpiperazino)-1-phenylethyl isothiouronium chloride dihydrochloride, precipitated with dry ether. This solid is very hygroscopic.

Analysis—Nitrogen: Calcd. 14.4%; fd. 14.5%

The chloride dihydrochloride above prepared (19.0 gms.) (0.05 mole) dissolved in water (100 ml.) is added to water (50 ml.) containing sodium hydroxide (8.0 gms.) (0.2 mole). The solution is ether extracted three times and dried over anhydrous sodium sulfate. To the clear solution is added ether-hydrogen chloride. Crystallized from ethanol, the product dl-2-(4-methylpiperazino)-1-phenylethanethiol dihydrochloride dihydrate, melts at 167–168° C. Yield 20%.

Analysis—

Nitrogen: Calcd. 8.1%; fd. 8.32%
Sulfur: Calcd. 9.2%; fd. 8.95%

*Example IV*

Styrene oxide (60 gms.) (0.5 mole) is added to methanol (150 ml.) containing methylamine (22.4 gms.) (0.7 mole). The clear solution is allowed to stand for ten days, after which the excess methylamine and methanol are removed by distillation. The product 2-methylamino-1-phenylethanol, is collected from 120–125° C./2 mm. Yield 67%.

50 gms. of the foregoing product (0.33 mole) is converted to its chloride hydrochloride salt with thionyl chloride. The product 2-methylamino-1-phenylethyl chloride hydrochloride, melts at 167° C. Yield 60%.

2-methylamino-1-phenylethyl chloride hydrochloride (20.6 gms.) (0.1 mole) and thiourea (7.6 gms.) (0.1 mole) are added to n-butanol. The solution is stirred and refluxed for six hours. Upon cooling ether is added and the liquid layer is decanted. To the residue dry ether is added and the solid is triturated. The product, dl-2-methylamino-1-phenylethyl isothiouronium chloride hydrochloride, melts at 153–154° C. Yield 63%.

Analysis—Sulfur: Calcd. 11.3%; fd. 11.41%

The foregoing chloride hydrochloride (14.1 gms.) (0.1 mole) dissolved in water (100 ml.) is added to water (100 ml.) containing potassium hydroxide (12 gms.). The solution is ether extracted three times and dried over anhydrous magnesium sulfate. To the clear solution is added ether-hydrogen chloride to give dl-2-methylamino-1-phenylethanethiol hydrochloride, a solid melting at 180° C. Yield 40%.

Analysis—

Carbon: Calcd. 53.0%; fd. 52.8%
Hydrogen: Calcd. 6.8%; fd. 5.7%

*Example V*

Styrene oxide (60 gms.) (0.5 mole) and pyrrolidine (35.5 gms.) (0.5 mole) are stirred and refluxed for six hours. After cooling the mass is poured into n-hexane to give a solid, 2-pyrrolidino-1-phenylethanol melting at 58° C. Yield 55%.

2-pyrrolidino-1-phenylethanol (47.8 gms.) (0.25 mole) is then converted to the chloride hydrochloride salt in the usual manner with thionyl chloride. Crystallized from ethanol, the hydrochloride melts at 185–186° C. Yield 58%.

The hydrochloride (24.6 gms.) (0.1 mole) is then dissolved in absolute ethanol (250 ml.) containing thiourea (7.6 gms.) (0.1 mole). The clear solution is stirred and refluxed for six hours; after which ethanol (160 ml.) is removed by distillation. To the residue is added ethyl acetate to precipitate 2-pyrrolidino-1-phenylethyl isothiouronium chloride hydrochloride which melts at 130–131° C. Yield 70%.

The above prepared chloride hydrochloride (16.1 gms.) (0.05 mole) is dissolved in water (30 ml.) and is added to water (25 ml.) containing potassium hydroxide (6.5 grams). The solution is ether extracted three times and dried over anhydrous magnesium sulfate. To the clear solution is added ether-hydrogen chloride. The resulting Analysis—
Nitrogen: Calcd. 5.4%; fd. 5.6%
Chlorine: Calcd. 13.78%; fd. 13.86%
Sulfur: Calcd. 12.4%; fd. 12.1%

2-piperidino-1-phenylethanethiol is prepared by treating the foregoing hydrochloride in the conventional manner with base.

The C.N.S. activity of representative compounds of the present invention is shown in the table below. The results are a measure of activity based on cerebral stimulation of chicks as set forth. The compounds used as standards, namely ephedrine HCl (Merck—U.S.P. 41726, 81.9% base) and d-desoxyephedrine HCl (Greff—PC401, 80.6% base) are known, commercially available, C.N.S. agents. In carrying out this test, groups of 1 and 2 day old chicks were injected beneath the skin of the axilla with test solution in the amount reported. All of the chicks were observed for symptoms of the type identified in the labelled columns.

| Compound | Mg. Base/Chick | No. of Chicks | Tremors | Drooping Wings | Excitability | Convulsions | Lethargy | Fatality |
|---|---|---|---|---|---|---|---|---|
| Ephedrine HCl | 1.0 | 5 | | | | | 5 | |
| | 2.0 | 5 | | 5 | | | 5 | |
| | 4.0 | 5 | | 5 | 5 | | 5 | |
| d-Desoxyephedrine HCl | 1.0 | 5 | 5 | 5 | 5 | 3 | | |
| | 2.0 | 5 | 5 | 5 | 5 | 5 | | 2 |
| Final Compound of Example III | 1.0 | 5 | | | | | | |
| | 2.0 | 5 | | | | | 5 | |
| | 4.0 | 5 | | 5 | 5 | 3 | 5 | 1 |
| Final Compound of Example V | 2.0 | 5 | ¹3 | 3 | 5 | 2 | | |
| | 3.0 | 5 | ¹5 | 4 | 5 | 3 | | 1 |
| | 4.0 | 5 | ¹5 | 5 | 5 | 5 | | 3 |

¹ Chirps.

solid dl-2-pyrrolidino-1-phenylethanethiol hydrochloride crystallized from ethanol melts at 173° C. Yield 86%.

Analysis—
Sulfur: Calcd. 13.1%; fd. 13.1%
Chlorine: Calcd. 14.5%; fd. 14.5%
Nitrogen: Calcd. 5.8%; fd. 5.85%

2-pyrrolidino-1-phenylethanethiol is recoverable from the foregoing hydrochloride by treating with base in the conventional manner.

*Example VI*

Styrene oxide (60 gms.) and piperidine (42.5 gms.) (0.5 mole) are stirred and refluxed for five hours. After cooling the mass is crystallized from ethanol. The product 2-piperidino-1-phenylethanol melts at 73° C. Yield 72%.

2-piperidino-1-phenylethanol (30.7 gms.) (0.15 mole) is converted to its chloride hydrochloride salt with thionyl chloride in chloroform. Crystallized from ethanol 2-piperidino-1-phenylethyl chloride hydrochloride melts at 186° C. Yield 85%.

The foregoing hydrochloride (26 gms.) (0.1 mole) in absolute ethanol (100 ml.) is stirred and refluxed and a solution of ethanol (100 ml.) containing thiourea (7.7 gms.) (0.1 mole) is added. The solution is then refluxed for six hours. Ethanol (120 ml.) is distilled off; the residue is cooled, ethyl acetate is added to precipitate 2-piperidino-1-phenylethyl isothiouranium chloride hydrochloride, melting at 158–160° C. Yield 86%.

The chloride hydrochloride prepared above (26.9 gms.) (0.08 mole) is dissolved in water (125 ml.) and then added to water (30 ml.) containing potassium hydroxide (10 gms.). The solution is ether extracted three times, dried over anhydrous magnesium sulfate. To the clear solution is added ether-hydrogen chloride. The product is dissolved in acetone and ether added to precipitate dl-2-piperidino-1-phenylethanethiol hydrochloride a solid melting at 182–183° C. Yield 60%.

It will be noted that the identified compounds produced results comparing favorably with known, active C.N.S. agents.

The examples above set forth representative compounds of the type encompassed with the scope of the present invention. Since the examples were necessarily set forth with some degree of specificity, nothing therein should be considered as a limitation on the scope or breadth of this invention. The latter is to be limited only by the claims appended hereto.

The invention claimed is:

1. The method of preparing a compound selected from the group consisting of a compound of the formula

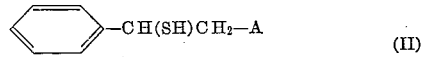

wherein A is a monovalent radical selected from the group consisting of cyclohexylamino, morpholino, piperazino, piperidino, pyrrolidino which comprises reacting a compound selected from the group consisting of cyclohexylamine, morpholine, piperazine, piperidine, and pyrrolidine with an equimolar amount of styrene oxide to produce an intermediate 2-substituted-1-phenylethanol which is converted to the chloride hydrochloride on treatment with thionyl chloride, reacting the chloride hydrochloride with thiourea in equimolar amounts to produce an 2-substituted-1-phenylethyl isothiouranium chloride hydrochloride which is converted to the desired product by treating with inorganic base.

2. The method as claimed in claim 1 wherein the nitrogen containing cyclic compound is morpholine.

3. The method as claimed in claim 1 wherein the nitrogen containing cyclic compound is cyclohexylamino.

4. The method as claimed in claim 1 wherein the nitrogen containing cyclic compound is piperazine.

5. The method as claimed in claim 1 wherein the nitrogen containing cyclic compound is piperidine.

6. The method as claimed in claim 1 wherein the nitrogen containing cyclic compound is pyrrolidine.

7. The method of preparing 2-morpholino-1-phenylethanethiol which comprises reacting equimolar amounts of morpholine and styrene oxide under reflux condition to produce an intermediate 2-morpholino-1-phenylethanol which on treatment with thionyl chloride is converted to 2-morpholino-1-phenylethyl chloride hydrochloride, reacting the latter with thiourea and treating the resulting compound with inorganic base to produce 2-morpholino-1-phenyl ethanethiol.

8. The method which comprises reacting pyrrolidine with styrene oxide in equimolar amounts by heating the same under reflux, converting the resulting 2-pyrrolidine-1-phenylethanol to the chloride hydrochloride by reacting the same with thionyl chloride, reacting the 2-pyrrolidino-1-phenylethanol chloride hydrochloride with thiourea and treating the resulting compound with an inorganic base to produce 2-pyrrolidino-1-phenylethane-thiol.

References Cited by the Examiner

UNITED STATES PATENTS

| | | | |
|---|---|---|---|
| 2,505,870 | 5/1950 | Snyder et al. | 260—293.4 X |
| 2,680,115 | 6/1954 | Ruddy et al. | 260—293.4 |
| 3,010,971 | 11/1961 | Kaiser et al. | 260—268 X |

OTHER REFERENCES

Japanese Patent 10,859, Aug. 10, 1960 (6 pages); abstracted in Chem. Abstracts, vol. 55, page 462 (January 1961).

Migrdichian: Organic Synthesis (Textbook), vol. I, page 89 (1957).

Noller: Chemistry of Organic Compounds (textbook), Second Edition, page 276 (1957).

HENRY R. JILES, *Acting Primary Examiner.*

ROBERT L. PRICE, JOSE TOVAR, *Assistant Examiners.*